US012763579B2

(12) United States Patent
Vu et al.

(10) Patent No.: US 12,763,579 B2
(45) Date of Patent: Oct. 13, 2026

(54) POWER CONVERSION DEVICE FOR AN ELECTRIC VEHICLE

(71) Applicant: LITE-ON Technology Corporation, Taipei City (TW)

(72) Inventors: Lam Vu, Taipei City (TW); Yi-Chao Fan, Taipei City (TW); Chih-Yu Kuo, Taipei City (TW)

(73) Assignee: LITE-ON Technology Corporation, Taipei (TW)

( * ) Notice: Subject to any disclaimer, the term of this patent is extended or adjusted under 35 U.S.C. 154(b) by 21 days.

(21) Appl. No.: 19/053,321

(22) Filed: Feb. 13, 2025

(65) Prior Publication Data

US 2025/0183669 A1 Jun. 5, 2025

Related U.S. Application Data

(63) Continuation of application No. 18/482,044, filed on Oct. 6, 2023, now Pat. No. 12,255,460.

(60) Provisional application No. 63/415,292, filed on Oct. 12, 2022.

(51) Int. Cl.

| | |
|---|---|
| ***B60L 53/22*** | (2019.01) |
| ***B60L 55/00*** | (2019.01) |
| ***H02J 3/32*** | (2026.01) |
| ***H02M 1/00*** | (2007.01) |
| ***H02M 1/36*** | (2007.01) |
| ***H02M 7/797*** | (2006.01) |

(52) U.S. Cl.
CPC .............. *H02J 3/322* (2020.01); *B60L 53/22* (2019.02); *B60L 55/00* (2019.02); *H02M 1/0067* (2021.05); *H02M 1/36* (2013.01); *H02M 7/797* (2013.01); *B60L 2210/10* (2013.01); *B60L 2210/40* (2013.01)

(58) Field of Classification Search
CPC ... H02J 3/322; H02J 3/32; B60L 53/22; B60L 55/00; B60L 2210/10; B60L 2210/40; H02M 1/0067; H02M 1/36; H02M 7/797; H02M 1/007; H02M 1/32; H02M 1/00; Y02T 10/70; Y02T 10/7072
USPC ........................................................... 307/9.1
See application file for complete search history.

(56) References Cited

U.S. PATENT DOCUMENTS

| | | | | |
|---|---|---|---|---|
| 11,984,759 B2 * | 5/2024 | Kamalasadan | | H02J 9/062 |
| 2015/0217656 A1 * | 8/2015 | Loftus | | B60L 1/006 320/136 |
| 2024/0243578 A1 * | 7/2024 | Karjalainen | | H02J 9/06 |

* cited by examiner

*Primary Examiner* — Rexford N Barnie
*Assistant Examiner* — Xuan Ly

(57) ABSTRACT

A power conversion device used in electric vehicles includes a transmission assembly and a power converter. The transmission assembly is detachably connected to the electric vehicle and receives a first power from the battery pack of the electric vehicle. The power converter is electrically connected to the transmission assembly and converts the first power into a second power or a third power. The power converter is configured outside the electric vehicle.

13 Claims, 3 Drawing Sheets

POWER CONVERSION DEVICE FOR AN ELECTRIC VEHICLE

CROSS REFERENCE TO RELATED PRESENT DISCLOSURE

This application is a continuation of U.S. patent application Ser. No. 18/482,044, filed Oct. 6, 2023, titled "POWER CONVERSION DEVICE FOR AN ELECTRIC VEHICLE", which claims the priority benefit of provisional Patent Application Ser. No. 63/415,292, filed on Oct. 12, 2022, the full disclosure of which is incorporated herein by reference.

TECHNICAL FIELD

The present invention relates to a power conversion device, and in particular, to a power conversion device applied to an electric vehicle.

RELATED ART

Due to the increasing global energy shortage and environmental pollution problems, energy saving and carbon reduction has become the goal and direction of our joint efforts. Therefore, electric vehicles that can reduce carbon emissions have become the development focus of many manufacturers. However, an electric vehicle is not only a means of transportation, but also an energy storage device. Therefore, how to provide a Vehicle-to-Home or Vehicle-to-Grid that can utilize the power stored in electric vehicles has become one of the important issues.

SUMMARY

The present invention provides a power conversion device that can utilize the power stored in an electric vehicle to realize Vehicle-to-Home or Vehicle-to-Grid.

The power conversion device of the present invention includes a transmission assembly and a power converter. The transmission assembly is detachably connected to the electric vehicle and receives a first power from the battery pack of the electric vehicle. The power converter is electrically connected to the transmission assembly and converts the first power into a second power or a third power. The power converter is configured outside the electric vehicle.

In one embodiment of the present invention, the first power is a direct current, the second power is a direct current, and the third power is an alternating current.

In one embodiment of the present invention, the transmission assembly includes a connector and a transmission line; one end of the transmission line is electrically connected to the connector, and the other end of the transmission line is electrically connected to the power converter.

In one embodiment of the present invention, the connector is a Society of Automobile Engineers (SAE) J1772 connector, a Combined Charging System (CCS) connector, or a North American Charging Standard (NACS) connector.

In one embodiment of the present invention, when the remaining power of the battery pack of the electric vehicle reaches a critical value, the power converter stops operating.

In one embodiment of the present invention, the power converter includes a switching module, a first converter, a second converter; and a control circuit. The switching module is coupled to the transmission assembly. The control circuit is electrically connected to the switching module and controls the switching module to electrically connect to the first converter or the second converter according to a first demand command.

In one embodiment of the present invention, the power conversion device further includes a power storage electrically connected to the first converter and the second converter. The control circuit controls the power storage to release energy to the second converter according to a second demand command.

In one embodiment of the present invention, when the first converter is electrically connected to the switching module, the first converter converts the first power into the second power and transmits the second power to the power storage.

In one embodiment of the present invention, when the second converter is electrically connected to the switching module, the second converter converts the first power into the third power and transmits the third power to a load.

In one embodiment of the present invention, the second converter is electrically connected to a power grid, and the second converter is a grid-tie inverter.

In one embodiment of the present invention, when the power grid is out of power, the second converter stops transmitting the third power to the power grid.

In one embodiment of the present invention, the battery pack includes a high-voltage battery module and a low-voltage battery module, and the transmission assembly is electrically connected to the high-voltage battery module or the low-voltage battery module.

Based on the above, a power conversion device of the present invention receives and transmits the first power from the battery pack of the electric vehicle through the transmission assembly, and converts the first power into a second power or a third power through the power converter to achieve Vehicle-to-Home or Vehicle-to-Grid.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
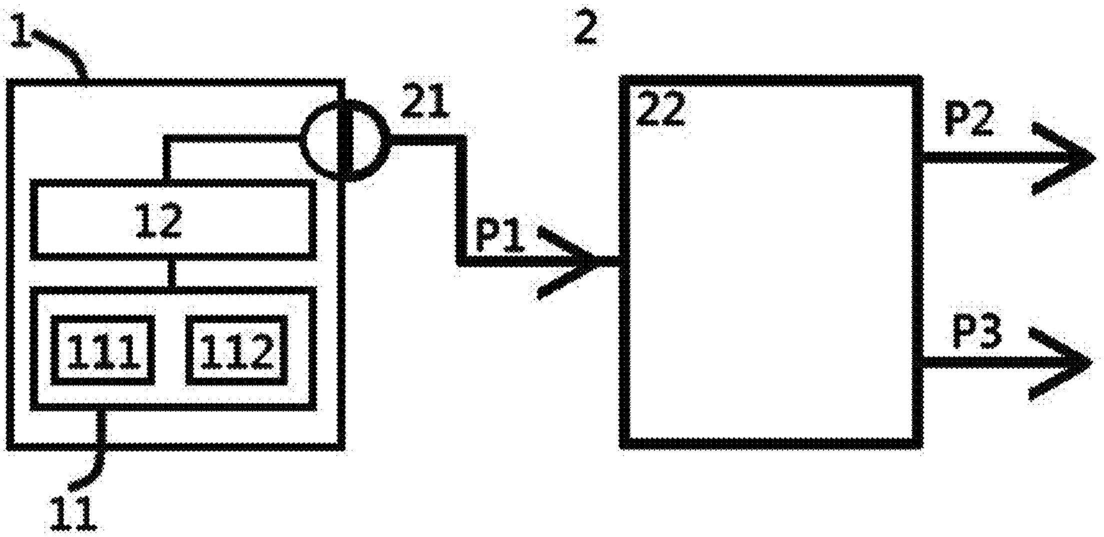
FIG. 1 is a schematic diagram of the power conversion device according to one embodiment of the present invention.

Refer to FIG. 1 illustrating a schematic diagram of the power conversion device according to one embodiment of the present invention. In this embodiment, the power conversion device 2 is applied to the electric vehicle 1. The electric vehicle 1 includes a battery pack 11 and a battery management system 12 for monitoring the status of the battery pack 11 and managing the charging and discharging of the battery pack 11. The power conversion device 2 includes a transmission assembly 21 and a power converter 22. The transmission assembly 21 is detachably connected to the electric vehicle 1. When the transmission assembly 21 is connected to the electric vehicle 1 and the electric vehicle 1 obtains authorization for external discharge, the battery management system 12 controls the battery pack 11 to discharge and transmits the stored first power P1 via the transmission assembly 21. The power converter 22 is electrically connected to the transmission assembly 21, converts the first power P1 into the second power P2 or the third power P3, and provides the second power P2 or the third power P3 to the backend for use.

In this embodiment, the first power P1 is a direct current, the second power P2 is a direct current, and the third power P3 is an alternating current. That is to say, the electric vehicle 1 has a discharge circuit served as a discharge path for the battery pack 11 to release the DC power stored in the battery pack 11 to the outside of the electric vehicle 1 such that the power conversion device 2 located outside the electric vehicle 1 is allowed to convert the DC power from the battery pack 11 into a desired DC power or AC power required by the back end according to the demand. In one embodiment, the battery pack 11 can have a high-voltage battery module 111 and a low-voltage battery module 112. The power conversion device 2 can selectively connect the high-voltage battery module 111 or the low-voltage battery module 112 according to the usage conditions to perform power conversion. In order to facilitate the user to perform Vehicle-to-Home or Vehicle-to-Grid, the power conversion device 2 is not a device or circuit installed in the electric vehicle 1. The power conversion device 2 can be a device directly fixedly configured in a building or a movable device, such as a device equipped with wheels, which can generally be placed in a garage or a parking lot and can be easily moved to other spaces when there are other needs. Alternatively, when the remaining power of the battery pack 11 of the electric vehicle 1 reaches a critical value, the power converter 2 stops operating or notifies the battery management system 12 of the electric vehicle 1 to stop the battery pack 11 from continuing to discharge. The critical value mentioned here is, for example, 40%, 30%, 20% of the remaining power of the battery pack 11 or a value preset by the user.

Figure 2:
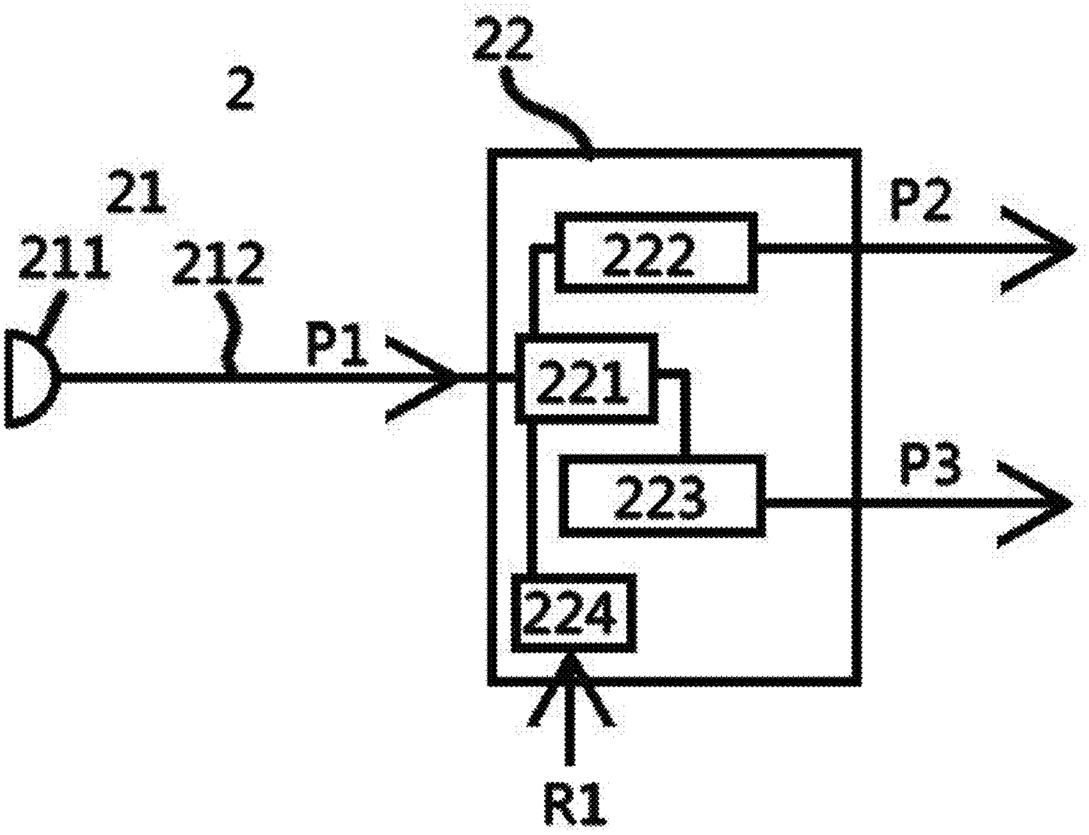
FIG. 2 is a schematic diagram of the power conversion device of FIG. 1.

Refer to FIG. 1 and FIG. 2 illustrating a schematic diagram of the power conversion device of FIG. 1. The transmission assembly 21 of the power conversion device 2 includes a connector 211 and a transmission line 212. One end of the transmission line 212 is electrically connected to the connector 211, and the other end of the transmission line 212 is electrically connected to the power converter 22. In this embodiment, the connector 211 is a Society of Automobile Engineers (SAE) J1772 connector, a Combined Charging System (CCS) connector, or a North American Charging Standard (NACS) connector.

The power converter 22 includes a switching module 221, a first converter 222, a second converter 223 and a control circuit 224. The switching module 221 is composed of, for example, a solenoid valve switch, a semiconductor switch, or other components that can achieve a switching effect, and the switching module 221 is coupled to the transmission assembly 21. The control circuit 224 is electrically connected to the switching module 221 and controls the switching module 221 to be electrically connected to the first converter 222, or to be electrically connected to the second converter 223, or to be electrically connected to the first converter 222 and the second converter 223 according to the first demand command R1. In this embodiment, the first converter 222 is a DC/DC converter 222 and is used to convert the first power P1 into the second power P2, and the second converter 223 is a DC/AC converter 223 and is used to convert the first power P1 into the third power P3.

In this embodiment, the first demand command R1 may be a demand command issued by the user through an operating interface or an operating medium, or may be a demand command sent from a non-transitory data storage media or a computing device. Specifically, the non-transitory data storage media selects and responds to the required demand commands from the stored data in the media based on the back-end operating conditions, load conditions, or the power capability of the power conversion device 2 itself. In addition, the computing device has, for example, a storage, a calculator and a controller. At least one specific calculation model and weighting mechanism are stored in the storage. The computing device performs calculations based on the received parameters, the selected calculation model and the weights, and provides the results to the controller, so that the controller issues the demand command to at least one controlled object according to the result. That is to say, the computing device can adopt a specific computing model in accordance with the weight of each parameter based on parameters such as the back-end usage conditions, load conditions, temperature of components or transmission lines, or the power capability of the power conversion device 2 to generate the demand command after the calculation. In other words, the power conversion device 2 is able to adjust the characteristics of the output power according to the back-end conditions or load conditions without exceeding its own conversion capability.

Figure 3:
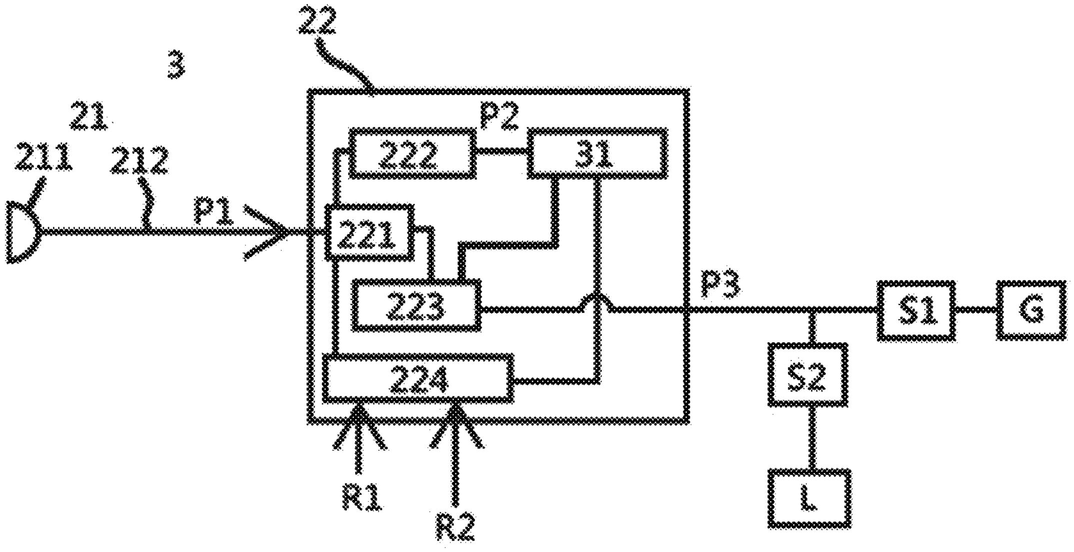
FIG. 3 is another schematic diagram of the power conversion device according to one embodiment of the present invention.

Refer to FIG. 3 illustrating another schematic diagram of the power conversion device according to one embodiment of the present invention. In this embodiment, the difference between the power conversion device 3 and the power conversion device 2 is that the power conversion device 3 further includes a power storage 31. The power storage 31 is electrically connected to the first converter 222 and the second converter 223. In this embodiment, when the first converter 222 is electrically connected to the switching module 221 and receives the first power P1 transmitted through the transmission assembly 21, the first converter 222 converts the first power P1 into the second power P2, and transmits the second power P2 to the power storage 31. When the second converter 223 is electrically connected to the switching module 221 and receives the first power P1 transmitted through the transmission assembly 21, the second converter 223 converts the first power P1 into the third power P3 and transmits the third power P3 to a load L. Alternatively, the switching module 21 may also be electrically connected to the first converter 222 and the second converter 223 at the same time. At this time, the first power P1 can not only be converted into the second power P2 to charge the power storage 31, but the second converter 223 can also provide the third power P3 to the load L at the backend.

In this embodiment, the control circuit 224 controls the power storage 31 to release energy to the DC/AC converter 223 according to a second demand command R2. The second demand command R2 may be a demand command issued by the user through an operating interface or an operating medium, or may be a demand command sent from a non-transitory data storage media or a computing device. Specifically, the non-transitory data storage media selects and responds to the required demand commands from the stored data in the media based on the back-end operating conditions, load conditions, or the power capability of the power conversion device 3 itself. In additional, the computing device can adopt a specific computing model in accordance with the weight of each parameter based on parameters such as the back-end usage conditions, load conditions, or the power capability of the power conversion device 3 to generate the demand command after the calculation.

Furthermore, the second converter 223 can also be electrically connected to a power grid G, and the second converter 223 is a grid-tie inverter. The power conversion device 3 provides an operation mode in which the third power P3 is provided to the power grid G. For example, the electricity is sold to a local power company or used as a source of electricity for loads in the power grid G. In this operating mode, when the power grid G is powered off, the power conversion device 3 stops transmitting the third power P3 to the power grid G. In addition, when the power conversion device 3 is in an operation mode of providing the third power P3 to the load L, for example, an operation mode of an uninterruptible power supply system or a power backup system.

In order to utilize the power, a first measurement device S1 and a second measurement device S2 can be installed between the power conversion device 3 and the power grid G and between the power conversion device 3 and the load L. The first measurement device S1 transmits the power supply status and power usage information of the power grid G to the control circuit 224, the second converter 223, the non-transitory data storage media or computing device. The second measurement device S2 is used to measure the power usage information of the load L, and transmit the measurement results to the control circuit 224, the second converter 223, the non-transitory data storage media or the computing device. Therefore, the output of the power conversion device 3 is consistent with the actual conditions of the power grid G and the load L. In other words, the power conversion device 3 is able to provide the third power P3 to reduce the fluctuation of the power supply frequency and to achieve the stability of the power supply when the power supply frequency of the power grid G drops. It can also store power in advance and supply power when the load L increases.

To sum up, the power conversion device of the present invention receives and transmits the first power from the battery pack of the electric vehicle through the transmission assembly, and converts the first power into a second power or a third power through the power converter to achieve Vehicle-to-Home or Vehicle-to-Grid.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A power conversion device, comprising:

a first converter converting a first power into a second power;

a power storage electrically connected to the first converter and receiving the second power;

a second converter electrically connected to the power storage and a power grid, wherein the second converter receives the second power form the power storage and converts the second power into a third power; and a control circuit electrically connected to the first converter, the power storage and the second converter, a first measurement device installed between the second converter and the power grid, wherein the first measurement device transmits a power supply status and power usage information of the power grid to the control circuit or the second converter, and the second converter provides the third power to the power grid when a power supply frequency of the power grid drops;

wherein the second converter stops transmitting the third power to the power grid in response to the power grid is out of power.

2. The power conversion device according to claim 1, wherein the first power is a direct current, the second power is a direct current, and the third power is an alternating current.

3. The power conversion device according to claim 1, wherein the first converter receives the first power from a battery pack of an electric vehicle.

4. The power conversion device according to claim 1, further comprising a switching module which is electrically connected to the first converter, the second converter and the control circuit, wherein the switching module is controlled by the control circuit to electrically connect to the first converter or the second converter according to a command.

5. The power conversion device according to claim 4, wherein the command is issued by a user through an operating interface, or issued from a non-transitory data storage media or a computing device.

6. The power conversion device according to claim 1, wherein the second converter is a grid-tie inverter.

7. A power conversion device for an electric vehicle, comprising:

a transmission assembly detachably connected to the electric vehicle and receiving a first power from a battery pack of the electric vehicle; and a power converter electrically connected to the transmission assembly and having a first converter, a power storage, a second converter and a control circuit, wherein the first converter converts a first power into a second power, the power storage is electrically connected to the first converter and receives the second power, the second converter is electrically connected to the power storage and a power grid, the second converter receives the second power form the power storage and converts the second power into a third power, the control circuit is electrically connected to the first converter, the power storage and the second converter, a first measurement device installed between the second converter and the power grid, wherein the first measurement device transmits a power supply status and power usage information of the power grid to the control circuit or the second converter, and the second converter provides the third power to the power grid when a power supply frequency of the power grid drops;

wherein the second converter stops transmitting the third power to the power grid in response to the power grid is out of power.

8. The power conversion device according to claim 7, wherein the power converter is configured outside the electric vehicle.

9. The power conversion device according to claim 7, wherein the first power is a direct current, the second power is a direct current, and the third power is an alternating current.

10. The power conversion device according to claim 7, wherein when a remaining power of the battery pack of the electric vehicle reaches a critical value, the power converter stops operating.

11. The power conversion device according to claim 7, further comprising a switching module which is electrically connected to the first converter, the second converter and the control circuit, wherein the switching module is controlled by the control circuit to electrically connect to the first converter or the second converter according to a command.

12. The power conversion device according to claim 11, wherein the command is issued by a user through an operating interface, or issued from a non-transitory data storage media or a computing device.

13. The power conversion device according to claim 7, wherein the second converter is a grid-tie inverter.

* * * * *